A. LINDGREN.
DISK HARROW.
APPLICATION FILED JULY 13, 1910.
1,033,330.
Patented July 23, 1912.
3 SHEETS—SHEET 2.
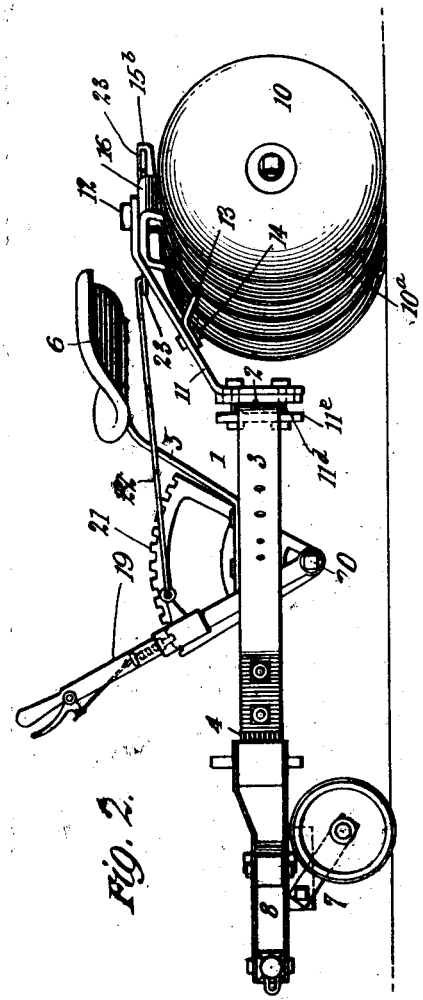
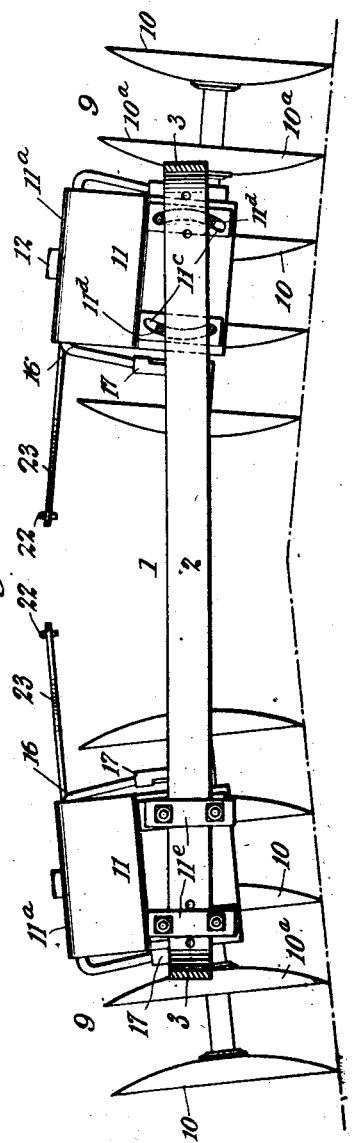

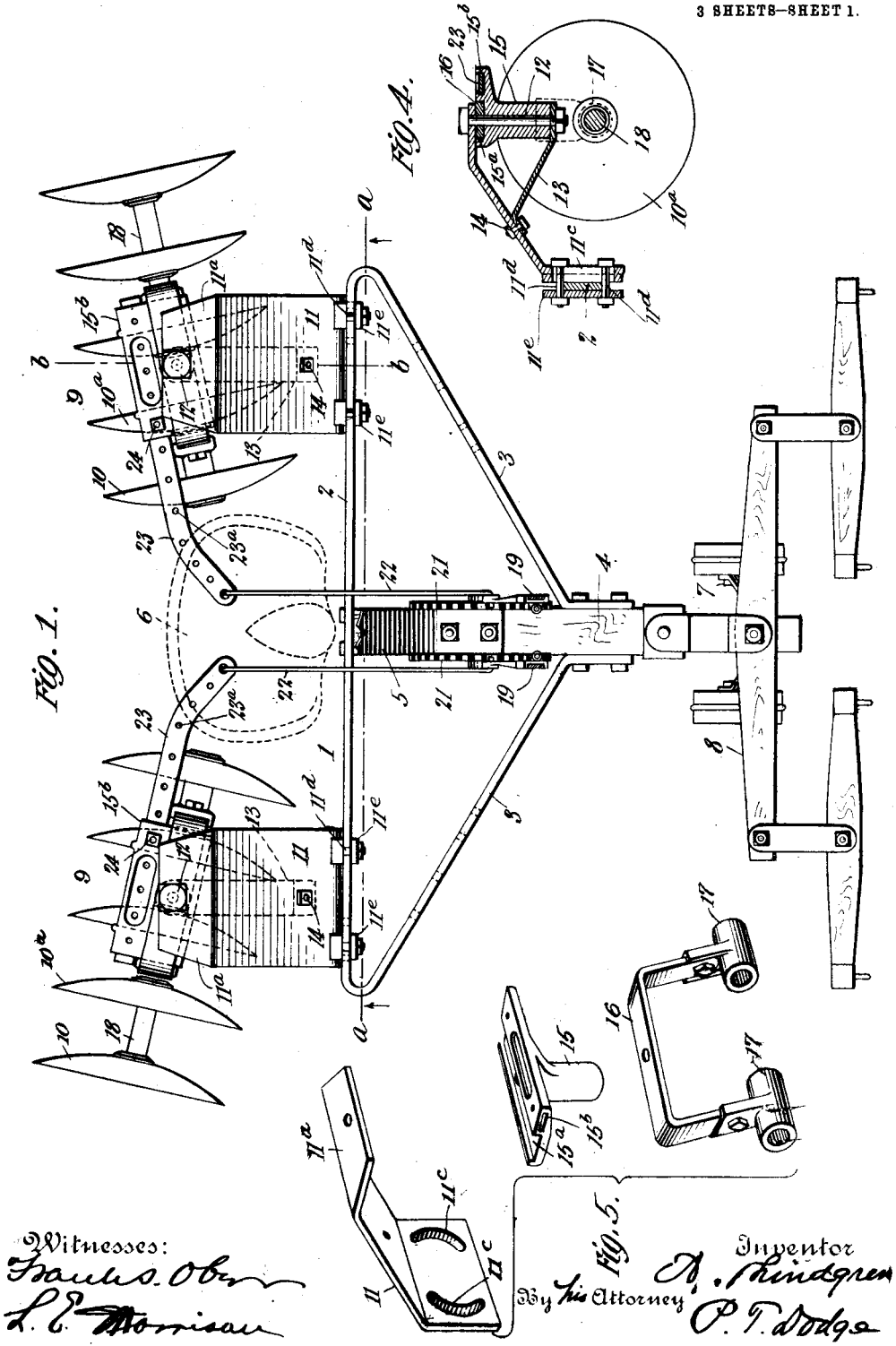

A. LINDGREN.
DISK HARROW.
APPLICATION FILED JULY 13, 1910.
1,033,330.
Patented July 23, 1912.
3 SHEETS—SHEET 3.
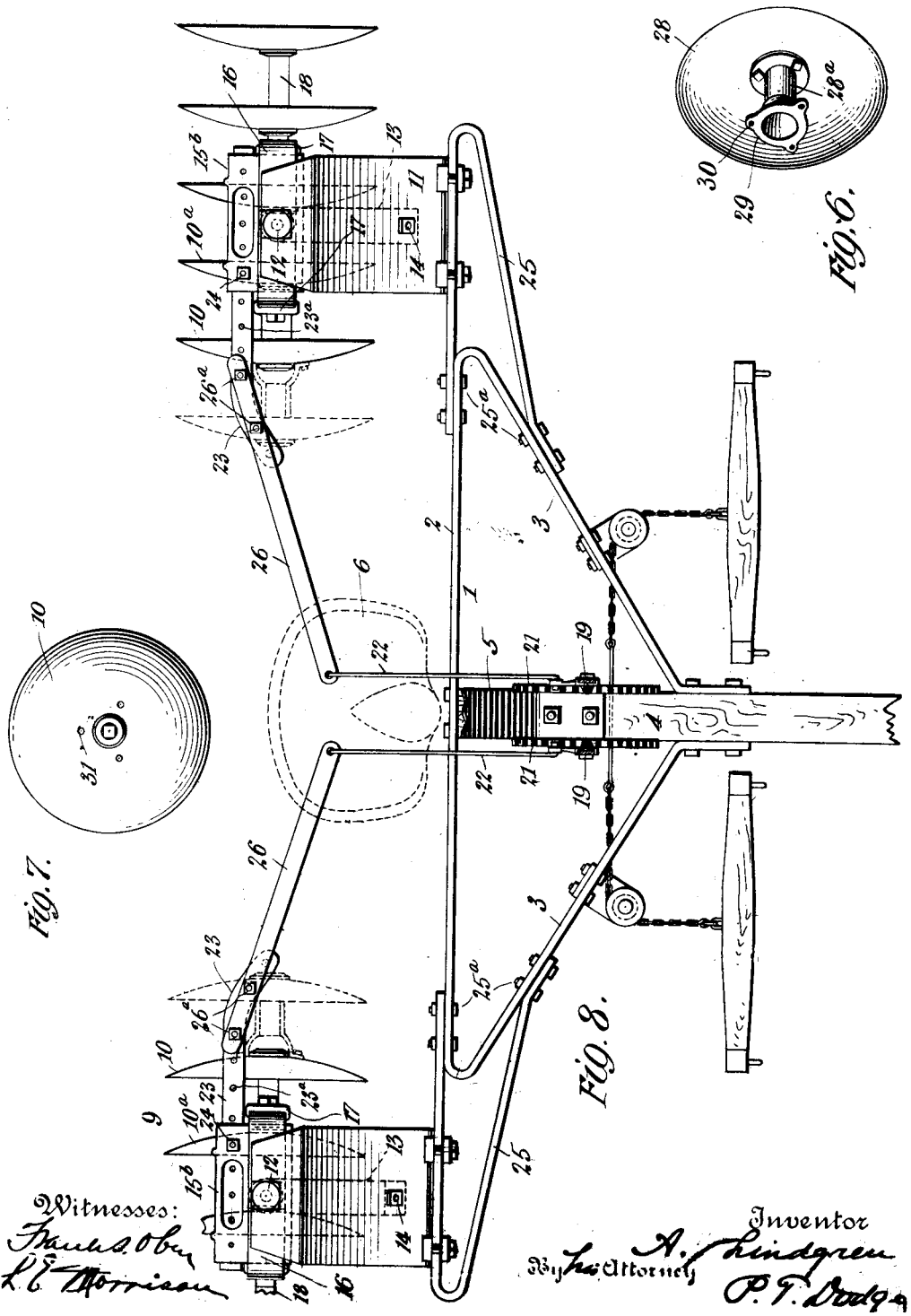

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

DISK HARROW.

1,033,330. Specification of Letters Patent. Patented July 23, 1912.

Application filed July 13, 1910. Serial No. 571,832.

*To all whom it may concern:*

Be it known that I, AUGUST LINDGREN, of Moline, county of Rock Island, and State of Illinois, have invented a new and useful Improvement in Disk Harrows, of which the following is a specification.

This invention relates to disk harrows and cultivators of the type embodying a sustaining frame equipped with gangs of disks, the object of the invention being to produce a machine of this character particularly suitable for operation in orchards, vineyards and like localities, where the foliage closely overhangs the ground.

With this end in view, my invention consists of various improved features of construction in the general organization of the machine designed to reduce the height of the same to a minimum, and directed to the manner of mounting and sustaining the disk gangs to permit their easy, quick and universal adjustments; to the form and construction of the adjusting devices for the disk gangs; to the provision of supplemental frames for attachment to the main frame for spreading the disk gangs or sustaining them at a greater distance apart than is possible by the main frame; to means for protecting the overlying foliage from injury by contact with the disks; and to various other features which will be more fully referred to hereinafter.

In the accompanying drawings: Figure 1 is a top plan view of my improved machine.
Fig. 2 is a side elevation of the same. Fig. 3 is a transverse sectional elevation looking rearwardly, the section being taken on the line *a—a* of Fig. 1. Fig. 4 is a longitudinal sectional elevation on the line *b—b* of Fig. 1 through the disk gang, the frame of the machine, and the devices by which the gangs are supported from the frame. Fig. 5 is a view, showing in perspective, the detailed parts of the devices by which the disk gangs are supported from the frame. Fig. 6 is a perspective view of an auxiliary disk adapted to be detachably applied to the end of the disk gang in order to increase the effective length of the gang. Fig. 7 is an elevation showing the form of the end disk of the gang to adapt the same to have the auxiliary disk applied to it. Fig. 8 is a top plan view of my improved machine showing the same provided with the extension frames by which the disk gangs are spread or supported at a greater distance apart than is possible by the main frame.

Referring to the drawings: 1 represents a supporting frame, consisting in the present instance of a rear frame bar 2 and two forward frame bar members 3, which extend forwardly from the ends of the rear member and have their forward ends firmly fixed to the sides of a draft tongue 4, fixed at its rear end by suitable means to the rear frame bar 2. At its rear end, the tongue gives support to a seat bracket 5, to which a driver's seat 6 is connected, the arrangement of these parts being such that the driver's seat will be sustained close down to the level of the frame. At its forward end, the frame, as shown in Fig. 2, is supported by a truck 7, and the draft may be applied to the tongue in any suitable manner, either by the doubletree construction 8 shown in Fig. 1, or by the evener draft attachment shown in Fig. 8, or by other suitable means.

The frame carries, in rear of the rear frame bar 2, disk gangs 9, there being two in the present instance, one at each side of the frame, and each gang comprising a plurality of disks 10, $10^a$, etc. These disk gangs are connected with the frame bar 2 in such manner that they may be adjusted bodily along said frame bar to and from each other to vary the distance between the gangs; adjusted bodily around a fore and aft horizontal axis to vary the inclination of the disks with reference to the surface of the ground; adjusted around a vertical axis to vary the inclination of the disks with reference to the line of travel; and reversed end to end in order to adapt the disks to throw the soil either inwardly or outwardly. The devices for connecting the disk gangs to the frame to adapt them to be adjusted in the manner mentioned consists in each case preferably of a bracket member 11, in the form of a wide plate having its front end bent downwardly and applied to the rear side of the frame bar 2, to which it is adjustably secured by the means presently to be described, whence the plate extends rearwardly and upwardly and is provided with a horizontal flat portion $11^a$. Depending from the center of this flat portion is a pivoting stud 12, passed at its upper end through the plate and extending at its lower end through a brace strap 13, the forward end of which is firmly secured to the body portion of the plate by means of a bolt 14, or by other suitable means, this construction sustaining the pivoting stud firmly and rigidly in an upright position. Mounted loosely on the pivoting stud between the plate and brace strap is a collar 15, extending laterally at its upper end in opposite directions and formed with a socket 15$^a$, and extending also at its upper end rearwardly, which rearwardly extending portion is provided with a socket 15$^b$, the purpose of which will presently appear. Seated in the socket 15$^a$ and beneath the rearward extension 11$^a$ of the plate, is a disk gang carrying-yoke 16, through which the pivoting stud 12 extends, and which yoke extends downwardly at its ends and has fixed to said ends journal sleeves 17, in which a shaft 18 is mounted, and on which shaft the disks of the gang are in turn mounted.

By the construction described, it will be observed that the disk gang is carried on the underside of the bracket member or plate in such manner that the gang may turn around a vertical axis represented by the pivoting stud 12, whereby the inclination of the disks to the line of draft may be varied. The entire gang may be turned end for end so that the disks will face either outwardly, as shown in the drawings, or may face inwardly, this being effected by withdrawing the pivoting stud 12, removing the yoke end for end and again applying the pivoting stud as before, to hold the yoke in its reversed position.

In order that the bracket members carrying the disk gangs may be adjusted bodily to and from each other along the frame bar 2, and in order that the gangs may also be adjusted around a fore and aft longitudinal axis, the forward downwardly extending portion of the plate is provided in opposite ends with curved slots 11$^c$, through which horizontal bolts 11$^d$ extend, and at the upper and lower edges of the frame bar 2. which bolts pass through vertical straps 11$^e$ applied to the front side of the frame bar, by which means the bracket members may be clamped firmly and fixedly to the frame bar. This construction admits of the bracket member being set in different positions along the frame bar, and also admits of the said member being adjusted around a longitudinal fore and aft axis, which latter adjustment is effected by tipping the bracket member relative to the frame bar, which tipping action is permitted by the curved slots 11$^c$.

In order that the driver may conveniently effect the adjustments of the gangs around the vertical pivoting studs, in order to vary the inclination of the disks to the line of travel, I provide adjusting levers 19 pivoted at their lower ends, as at 20, to the lower ends of segment frames 21 fixed to the opposite sides of the tongue, respectively, the said segment frames being provided with locking teeth adapted to be engaged by locking dogs on the levers, in order that the latter may be held in the different positions set. Connected to the levers, respectively, are two rearwardly extending longitudinal links 22, which are jointed at their rear ends respectively to the inner ends of adjusting arms 23, whose outer ends extend in the sockets 15$^b$ of the sleeve 15, respectively, in which they are adapted to be firmly fastened in different positions by means of fastening bolts 24, or by other means. As a result of this construction, when the levers are thrown forwardly, they will act, through the connection with the adjusting arms, to shift the disk gangs on the pivoting studs 12 to the position shown in Fig. 1; and when thrown rearwardly, they will act to shift the gangs in the opposite direction. By connecting the end of the adjusting arm 23 adjustably in the socket in the collar 15, the lateral adjustment of the gangs is permitted without affecting the longitudinal positions of the connecting links, it being but necessary, when the gangs are adjusted to and from each other, to correspondingly adjust the ends of the adjusting arms in the sockets, the said arms being provided with a number of holes 23$^a$ to receive the fastening bolts 24.

By constructing the bracket members in the form of wide plates, as described, they act in addition to their function of carrying the disks as shields for the disks, and prevent the contact of the foliage with the disks, thereby avoiding injury to the foliage. These bracket members therefore constitute in effect, combined disk-carrying and guard plates, serving the two-fold function of affording a means for sustaining the disks and also of guarding the overhanging foliage from injury thereby.

In order that the disk gangs may be "spread" or set at a greater distance apart than the length of the frame bar 2 of the main frame will permit, I provide supplemental frame members 25, as shown more particularly in Fig. 8, which supplemental frame members are adapted to be fixed detachably to the opposite ends of the main frame, and to have connected with them, when so applied, the disk gangs. These supplemental frame members are preferably of U-shape, and are applied to the main frame by fixing the free ends of the supplemental frames to the rear and front frame members respectively of the main frame, by means of fastening bolts 25$^a$, the rear limbs of the supplemental frames when thus applied forming outwardly extending continuations of the rear frame bar 2 of the main frame. The bracket members 11 are connected with the supplemental frame members in a manner similar to that described in their application to the main frame, and in order that when so connected the adjusting arms 23 may be operated by the hand levers without shifting or changing the positions of the longitudinal links 22. I provide lateral connecting links 26, jointed at their inner ends to the longitudinal links, and connected at their outer ends adjustably with the inner ends of the adjusting arms by bolts 26ª or otherwise. By this construction, it will be seen that it is possible to set the disk gangs at a considerably greater distance apart than is possible when the gangs are applied to the main frame, which adjustments are found to be necessary under certain conditions encountered in the use of the machine in the field.

In order that the effective length of the disk gangs may be increased, I provide for the attachment to the end disk of the gang of an auxiliary disk 28, shown in Fig. 6. This auxiliary disk has fixed to its center an axially extending hub portion 28ª, provided on its end with a lateral flange 29, provided with perforated lugs 30. In the application of the disk to the end disk of the gang, the flange is seated flatly against the convex surface of the end disk and firmly secured thereto by means of bolts passing through the perforated lugs on the flange and holes 31 in the end disk.

While in the accompanying drawings I have shown my invention as embodied in the specific form which I prefer to adopt, and which in practice has been found to answer to a satisfactory degree the ends to be attained, it will be understood that the invention is not limited to any particular form or details except in so far as such limitations are specified in the claims.

Having thus described my invention, what I claim is:—

1. In a disk harrow and in combination with a frame having a low transverse frame bar, a combined disk carrying and guard plate fixed at its forward end to the frame bar and extending rearwardly and upwardly therefrom above the plane of the disks, a pivoting stud depending from the upper portion of said plate, a disk gang mounted to rock on said stud, and means for adjusting the gang on the stud to hold it in different positions around a vertical axis.

2. In a disk harrow, and in combination with the frame, a combined disk-carrying and guard plate connected at its forward end to the frame and extending upwardly and rearwardly therefrom, and a disk gang carried by said plate directly beneath the upper portion thereof.

3. In a disk harrow and in combination with a frame provided with a transverse frame bar, a combined disk carrying and guard plate having its front end extending vertically and seated against and secured to the frame bar and extending rearwardly therefrom at an upward inclination, and having a horizontal portion at its upper end located above the plane of the disks, a stud depending from the upper horizontal portion of the plate, and a disk gang mounted on said stud.

4. In a disk harrow and in combination with a frame, a disk carrying bracket member fixed to the frame and extending rearwardly therefrom, a pivoting stud depending from said bracket member, a sleeve loosely encircling the stud, a yoke detachably connected with the sleeve between the upper end of the same and the bracket member, and a disk gang mounted in the yoke.

5. In a disk harrow, and in combination with the frame, a bracket member connected at its front end to the frame and extending rearwardly, a brace strap connected with the bracket and extending rearwardly, a pivoting stud mounted between the brace strap and bracket member, and a disk gang pivotally supported on the stud.

6. In a disk harrow, and in combination with the main frame, supplemental frames supported by the ends thereof, disk gangs pivoted on said supplemental frames respectively and adjustable laterally thereof, adjusting arms connected adjustably with the gangs and extending inwardly, transverse links connected with the inner ends of the respective arms and extending forwardly, hand levers on the frames, and connections between the hand levers and transverse links.

7. In a disk harrow and in combination with a series of rotary disks, means for connecting said disks in gang, a supplemental disk having an axially extending hub formed at its end to be detachably connected to one of the end disks of the gang independent of the connecting means.

8. In a disk harrow and in combination with a series of rotary disks, one of which disks at the end of the series is formed with bolt holes, means for connecting the disks in gang, a supplemental disk provided with a fixed axial extension having a projecting flange adapted to be seated against the face of the said end disk, and fastening bolts independent of the connecting means extending through holes in the extension and end disk, and serving to secure the supplemental disk detachably to said end disk.

9. In a disk-harrow, and in combination with the main frame adapted to carry adjustable disk-gangs, a supplemental extension-frame supported by the projecting end of the main frame and carrying an adjustable disk-gang, and adjusting means on the main frame connected to the gang on the supplemental frame and independently thereof, said means adapted to be connected also to the gang when carried by the main frame.

10. In a disk-harrow, and in combination with a three-sided main frame adapted to carry adjustable disk-gangs, a plurality of supplemental extension-frames supported adjacent the points of said main frame and carrying adjustable disk-gangs, and adjusting means on the main frame connected to the gangs on the supplemental frame, said means adapted to be connected also to the gangs when carried by the main frame.

In testimony whereof I hereunto set my hand this 11th day of July, 1910, in the presence of two attesting witnesses.

AUGUST LINDGREN.

Witnesses:
L. C. BLANDING,
C. A. RAMSLER, Jr.